Oct. 13, 1970 W. S. HALSTEAD 3,534,266
SYSTEM FOR AUTOMATIC TRANSMISSION AND RECEPTION
OF REPETITIVE PROGRAMS
Filed Sept. 28, 1967 2 Sheets-Sheet 1
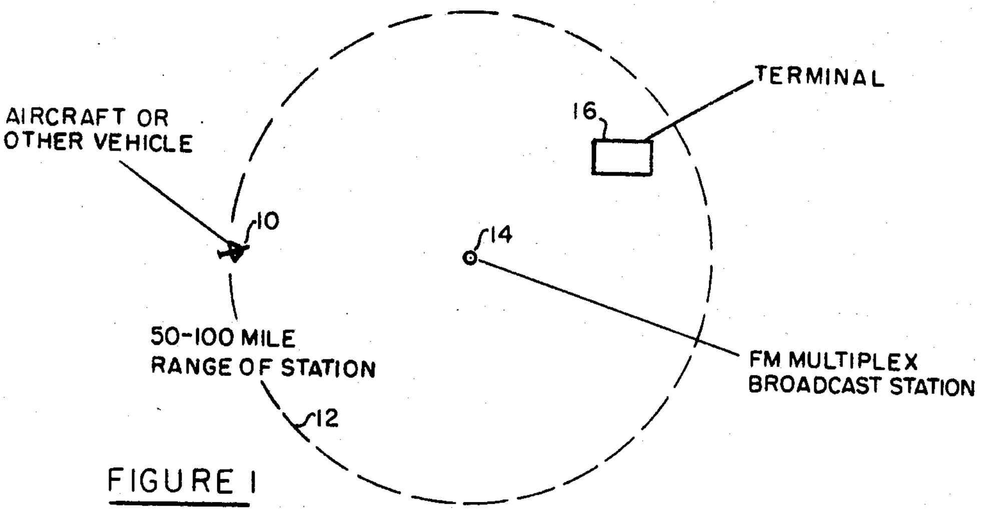
FIGURE I
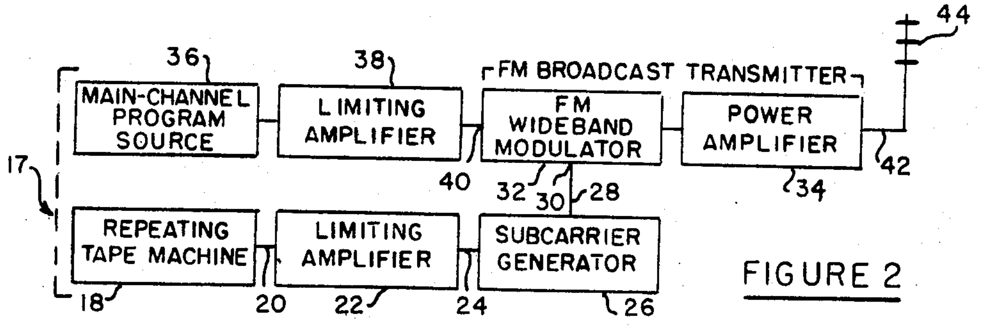
FIGURE 2
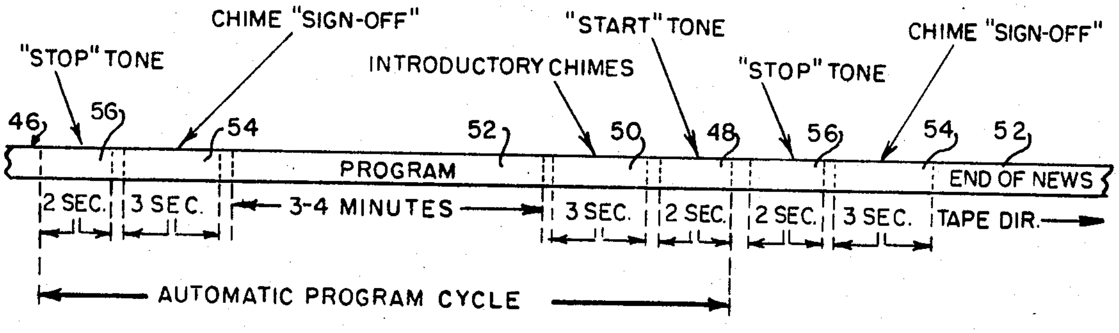
FIGURE 3
WILLIAM S. HALSTEAD
INVENTOR.
BY Anster & Rothstein

WILLIAM S. HALSTEAD
INVENTOR.

BY Amster & Rothstein

United States Patent Office 3,534,266

Patented Oct. 13, 1970

3,534,266

SYSTEM FOR AUTOMATIC TRANSMISSION AND RECEPTION OF REPETITIVE PROGRAMS

William S. Halstead, New York, N.Y., assignor to Newsrad Inc., New York, N.Y., a corporation of New York Filed Sept. 28, 1967, Ser. No. 671,455
Int. Cl. H04b 1/70, 7/20
U.S. Cl. 325—48 13 Claims

ABSTRACT OF THE DISCLOSURE

A system for transmitting and receiving repetitive program material in sequential cycles. The system includes a radio receiver and associated selective control circuits in a vehicle approaching a terminal within range of a radio transmitting station. The transmitter at the station is linked with a repeating-type signal reproducer for automatic transmission of a sequence of control, introductory and terminating signals, as well as a segment devoted to program material such as news, weather and traffic reports for the local area which the vehicle is approaching. When the vehicle has come within range of the station, an operator on the vehicle initiates the system's operation by actuation of a starting switch, whereby the receiver on the vehicle is set up to be automatically responsive to a "start" signal to be received from the transmitter. The "start" signal, transmitted just before the beginning of the program material, activates a selective control circuit in the receiver on the vehicle, permitting a complete program transmission to be heard, A "stop" signal on the tape following the program terminates further reception on the vehicle, avoiding repetition of transmitted information.

Figure 4:
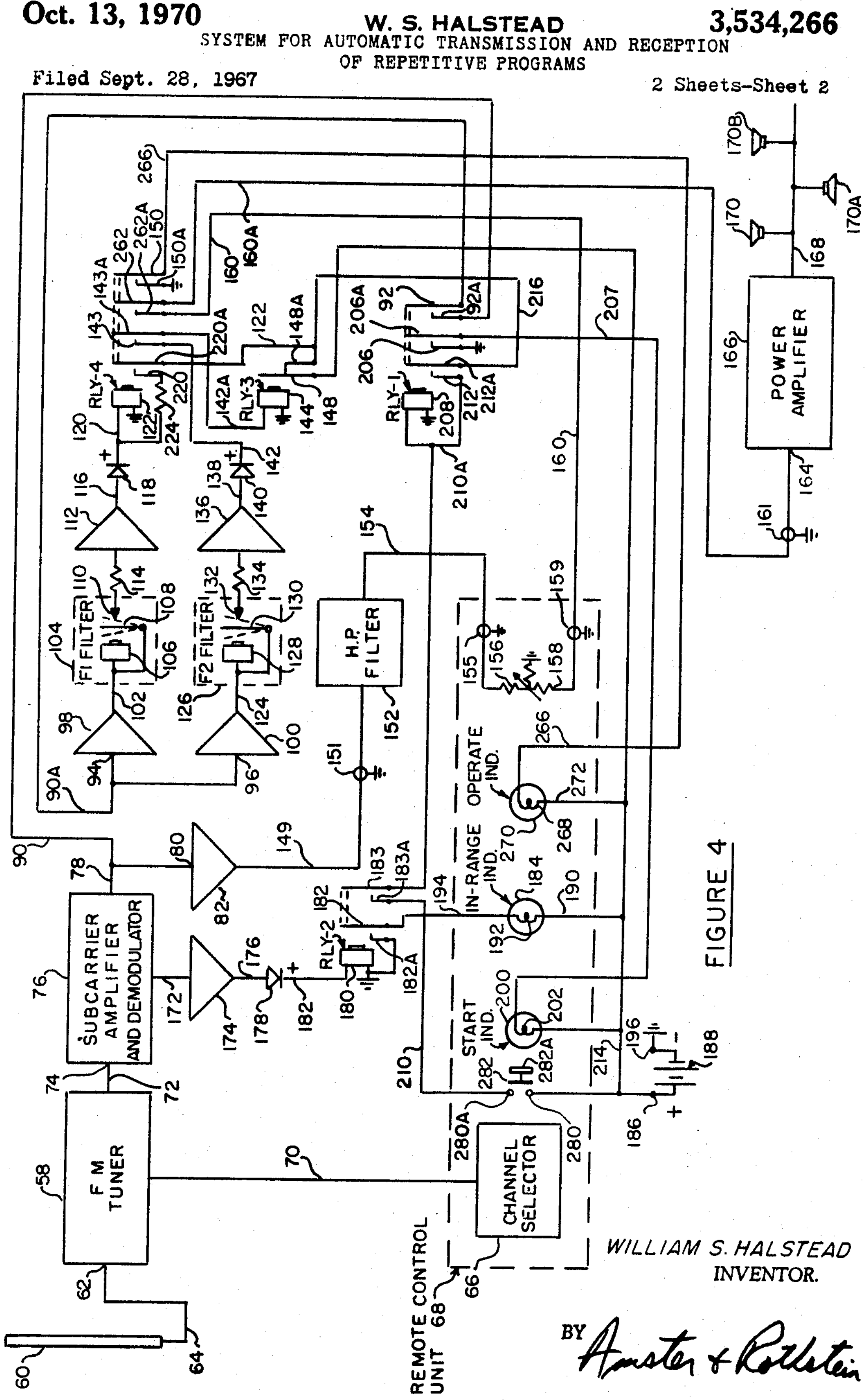

This invention relates to a system for automatic dissemination and selective reception of program material as transmitted continuously in repetitive, sequential cycles. More particularly, the invention relates to a transmitting and receiving system to effect automatic and selective control of reproduction at receiving points in such manner that all program material included within one of said repetitive and sequentially-transmitted program cycles may be reproduced, if desired, without overlap by signals in a succeeding program cycle. In addition, a specific type of program material such as market reports or information addressed to vehicles of a specific company may be selectively and automatically reproduced without intrusion of other information.

The invention is suited for use with, for example, FM broadcast transmitters and receivers appropriately equipped for multiplex subcarrier operation and is intended to permit listeners to receive a complete program (e.g., a summary of news or other information), beginning with a distinctive introductory signal and ending with a second distinctive signal. One possible application of the invention is to the transmission of news bulletins or other information to passengers of aircraft, buses, trains and other vehicles on approach to a destination. In such situations, it may be desired for passengers to hear a complete and properly-cycled reproduction of brief news or information summaries, such as weather and traffic reports, with the message beginning and ending with a distinctive audio signal.

The use of public broadcast channels for the purpose of transmitting control signals and brief repetitive programs to occupants of vehicles as they move within range of radio stations is precluded at present by commercial and legal limitations of the public broadcasting service. For economic and other reasons, public broadcast programs are directed to the largest possible audience and generally require a wide diversification of programming. Such programming, while perfectly acceptable in most situations, is not at all suited to the specialized needs of vehicle passengers approaching a particular locality. Quite often, these passengers require specialized local information not usually available on regular commercial stations. Moreover, even if the necessary information is eventually provided by local commercial stations, the vehicles' personnel have no control over the time of such programs—generally, they must wait until half-hourly or hourly broadcasts.

The present invention provides a means of resolving the radio transmission problem through the use of superaudible FM subcarrier impressed by multiplex method on the main carrier of an FM broadcast station in each locality to be served by the system. The multiplex signals, in this instance comprising control and special program signals, are not heard by the public and are intended for reception only by special receivers adapted for use in the system of the invention. Thus, by this method, it is feasible to transmit automatically a continuous series of repetitive programs, including control and identifying signals at the beginning and end of each program, as will be described in further detail hereinafter.

Also, while an FM multiplex transmission method is described for the illustrative application of the system of the invention in the air transportation field as described herein, it will also be recognized that other modes of signal transmission falling within the scope of the claims may be preferred in different applications of the system.

It is therefore a principal object of this invention to provide a system for automatic transmission and selective reception of repetitive program material as to effect automatic timing control of such program material.

It is another object of this invention to provide a radio receiving system that is simple in operation, permitting initiation of operation by actuation of a single momentary-contact switch, and subsequently providing one complete cycle of program material without further attention by the operator.

It is an additional object of this invention to provide a system in which sequentially transmitted series of repetitive programs such as news bulletins are automatically received after actuation of a simple initiating switch at a receiver in such manner that listeners will hear a complete program regardless of the time at which the initiating switch is actuated.

It is a further object of this invention to provide a radio transmitting and receiving system in which a particular type of program or programs addressed to a specific type of subscriber may be automatically and selectively reproduced at a receiving point after actuation of an initiating switch at the receiver.

In one illustrative application of the invention, receiving equipment made in accordance with the invention can be used in long-range jet aircraft to permit passengers on approach to urban areas to hear a program such as a brief summary of international, national and local news, including weather and traffic information. The program can be reproduced by the aircraft's public address system when the airliner carrying the equipment comes within reliable multiplex reception range of an FM broadcast station in the area which is continuously transmitting the programs together with associated control and identifying signals in sequentially repetitive program cycles. Initiation of reproduction of a complete program by the public address equipment in the aircraft is under control of a member of the crew who actuates a "start" button when the aircraft is within reliable multiplex reception range of the FM station (as indicated by actuation of an "In-Range" light). This places control circuitry of the multiplex receiver in condition to respond automatically to a "start" signal which is transmitted automatically by the FM station at the beginning of each program cycle. This signal actuates automatic switching means in the receiver, causing the received signals to be applied to an input circuit of the aircraft's public address system. Passengers thereby hear, in proper sequence, an introductory chime signal, a complete news bulletin and a concluding or "sign-off" chime signal. A "stop" signal, transmitted immediately after the chime "sign-off" signal, causes the audio output circuit of the multiplex receiver to be disconnected automatically from the public address system.

While the above general description and some of the detailed description below deal with use of the invention in passenger aircraft, it will be evident to those skilled in the art that there are many other possible applications of the system such as in other types of transportation (e.g., automobile, railroads, etc.), as well as in hotels, offices and homes.

It is therefore a feature of an embodiment of the invention that system means are provided to automatically disconnect the audio ouput of a receiver, employed in a repetitive sequential broadcasting system, from an associated sound reproduction means except when a desired segment of program material, as transmitted in sequentially repetitive cycles, is to be reproduced at the receiver.

It is another feature of an embodiment of this invention that radio receiving means, including automatic switching means selectively responsive to control signals, automatically applies audio program signals from the output of a subcarrier receiver to a sound reproducing means thereby making audible a complete program cycle, thereafter automatically removing the audio program signals from the sound reproducing means.

The above brief description, as well as further objects, features and advantages of the present invention, will be more fully appreciated by reference to the following detailed description of a presently preferred but nonetheless illustrative embodiment demonstrating objects and features of the invention when taken in conjunction with the accompanying drawing, wherein:

FIG. 1 schematically depicts the service area of a broadcast station that is employed for transmission of specialized program material addressed to passengers of vehicles in accordance with the invention, showing the approach of a vehicle to a terminal within transmission range of the broadcast station;

FIG. 2 is a block diagram of an illustrative arrangement of equipment at a typical FM broadcast station adapted for transmission of regular programs on its main channel and provided with means for effecting, on a multiplex subcarrier, repetitive transmission of tape recorded news bulletins or other program material and control signals therefor;

FIG. 3 depicts in schematic form a segment of an endless loop of magnetic tape which can be used with a repeating tape playback device to effect automatic transmission of control signals, identifying signals and brief news summaries or other program material in sequentially-repetitive program cycles, one of said cycles being illustrated schematically on the tape; and FIG. 4 is a diagram of an FM multiplex receiver, including a simplified schematic diagram of control means employed in association with my invention, to effect automatic reproduction of a complete news bulletin or other signals in a program cycle after actuation of a manually operated control switch and reception of a starting control signal signal.

Referring to FIG 1 in which one application of the system of the invention is depicted schematically, a vehicle 10, such as an aircraft, is shown entering a multiplex transmission zone 12 within which a strong subcarrier signal is received from a FM broadcast station 14. In this illustrative application, the aircraft 10 is shown on approach to a terminal area 16. In this instance, it is desired that passengers in the aircraft 10 hear a brief summary of the latest international, national and local news including, for example, current weather and traffic conditions within the area served by broadcast station 14. They may also hear other information of particular interest to the vehicle passengers as it nears its destination. In such an application of the invention, it is essential that the multiplex transmissions addressed to passengers of the vehicle be continuously available, so that regardless of the time at which the vehicle enters the multiplex reception zone, it will be possible for passengers to hear a complete news and information bulletin, beginning with the introductory identifying signal (e.g., the sound of a chime) and ending with a similar signal.

In order to effect continuous repetitive transmission of news bulletins or other program material in sequential cycles, a presently preferred arrangement for accomplishing this function is a transmitting system 17 including a repeating tape machine 18 (FIG. 2), which is representative of any well-known cartridge-type tape playback unit. This device may be remotely located at a central news studio or any other suitable point and connected by means of a telephone line 20 or other communications link to an amplifier 22, preferably of well-known automatic amplitude-limiting type whose output 24 is connected to an FM multiplex subcarrier generator 26. The generator 26 may be any well-known type incorporating circuitry for generating and modulating a super-audible FM multiplex subcarrier at a suitable subcarrier frequency, such as 41 kHz. or 67 kHz. The subcarrier output 28 is connected to the subcarrier input 30 of an FM wideband modulator 32, or may be otherwise connected by any well-known means to effect frequency modulation of the FM broadcast transmitter in which the modulator 32 and power amplifier 34 are component parts. Public broadcast program signals are transmitted conventionally from a main-channel program source 36 through limiting amplifier 38 to the main channel input 40 of the FM wideband modulator 32. (In this illustrative block diagram, it is assumed that the FM wideband modulator 32, includes, as is standard practice, the necessary and well-known types of circuitry to generate and modulate the main carrier of the station as well as means for modulating the main carrier by the FM multiplex subcarrier without introducing objectionable cross-modulation between the main carrier and subcarrier signals.) The output 42 of power amplifier 34 is connected to antenna 44, which normally is of omnidirectional type for FM broadcast service, but which may be of a directional type as desired in certain applications.

The diagram of FIG. 3 schematically illustrates a section of an endless loop of magnetic tape 46 normally employed in association with repeating tape machine 18. Since the tape 46 is moving from left to right as seen in FIG. 3, the "beginning" of the program segment 52 is at the right in FIG. 3. Thus, a "start" tone, having an illustrative frequency of 77 Hz. (this frequency can be varied, but preferably is below or above the voice band which can be taken as occupying the band between approximately 100 Hz. and 3000 Hz.), is recorded for a period of approximately 2 seconds in tape segment 48. The time period occupied by the "start" tone, as well as the other signals shown in FIG. 3, is merely illustrative and may be changed to fit particular situations. Immediately following the "start" tone, an introductory or identifying signal, such as the sound of chimes, is recorded in the tape segment 50 for a period of approximately 3 seconds. A summary of news and information or other program material to be repetitively transmitted is recorded for a period of 3–4 minutes or other desired program period in the next tape segment 52, following the introductory signal. At the conclusion of the news or information summary, a chime or other appropriate signal is recorded on tape segment 54 for a period of approximately 3 seconds to indicate the conclusion of the news or information bulletin. The concluding or "sign off" signal is followed by a "stop" tone having an illustrative frequency of 67 Hz. (or other suitable frequency, preferably outside of the 100–3000 Hz. voice band), which is recorded for a period of approximately 2 seconds at tape segment 56. The portion of the tape extending from the beginning of segment 48 in which the "start" tone is recorded to the end of segment 56 in which the "stop" tone is recorded is designated, for the purpose of identification and description, as an automatic program cycle.

It is assumed that the tape, if of cartridge type, will carry a complete recording of all signals included within at least one automatic program cycle. In this case, with the tape in endless loop configuration, the stop tone segment 56 shown to the right of start tone segment 48 is the same segment 56 that was described previously. Similarly, the chime "sign off" segment 54, shown at the far right in FIG. 3 is the same segment 54 that was described previously. It is therefore apparent that the tape will, when placed in any suitable repeating-type playback machine (FIG. 2), continuously and automatically reproduce, in a repetitive manner, all signals included within the automatic program cycle shown schematically between segments 48 and 56 in FIG. 4. (The present invention also contemplates the use of endless loops of tape where adjacent start and stop tones and program material are not the same—i.e., where two or more different "automatic program cycles" are recorded on the same tape. By arranging the receiving equipment to be selectively responsive to particular start and stop tones, appropriate program material can be directed at different audiences in a plurality of vehicles.)

Where the program material contained in tape segment 52 consists of news bulletins, such information may be changed every hour or whenever important news events occur. This normally is accomplished by changing tape cartridges (not shown), carrying all signals, at the news studio. All control, identifying and program signals are recorded in proper sequence by any well-known method prior to the insertion of the tape cartridge in tape machine 18.

Referring to FIG. 4, showing a presently preferred arrangement of receiving, control and sound reproducing equipment employed in one illustrative application of the invention, as in aircraft as discussed above, a conventional frequency modulation (FM) tuner 58 is used in receiving a selected FM radio carrier signal on which is impressed a subcarrier signal. Antenna 60 is preferably of a type that has omnidirectional and omnipolar response characteristics, such as the helical antenna and integrated transistor preamplifier described in my copending patent application Ser. No. 618,877, filed Feb. 27, 1967. That antenna is well adapted for use on vehicles as set forth in said copending application, and is connected with the RF input 62 of FM tuner 58 by means of lead 64 which may be a coaxial cable. The tuner 58 may be operated on a selected FM broadcast channel by use of any well-known and suitable type of channel selector switching unit 66 which is connected through cable 70 to the appropriate RF tuning circuitry incorporated within FM tuner 58. In the airborne application, for example, the channel selector 66 may be incorporated in a remote control unit 68 which may be mounted on a wall surface within an airliner at a point that is convenient for operation by plane personnel (e.g., in the crew or attendant's area). The tuner 58 normally is located in another part of the plane, such as on an equipment rack (not illustrated) and is pretuned to a designated broadcast frequency in advance of the entry of the aircraft within the FM multiplex service zone 12 (FIG. 1) of the station that is employed in transmitting recurrent news bulletins and control signals in a given area.

The subcarrier output 72 of FM tuner 58 is connected to the subcarrier input 74 of a subcarrier amplifier and demodulator 76 which conventionally includes circuitry for amplifying, limiting and demodulating the FM subcarrier signal. The audio output circuit 78 of the subcarrier amplifier and demodulator 76 is connected to the audio input circuit 80 of an audio amplifier 82 of any well-known type. The output circuit 78 of the subcarrier amplifier and demodulator 76 also is connected through conductor 90 to contact 92A of normally open relay contacts 92, 92A of relay RLY–1 in which solenoid 208 is the activating member. Relay contact 92 is connected through conductor 90A to the audio input circuits 94 and 96 of amplifiers 98 and 100, respectively. The audio output circuit 102 of amplifier 98 is connected to a sharply tuned filter 104, in this instance of tuned reed responder type having solenoid 106, a tuned reed 108 and reed contact arm 110. When the reed 108 is energized at its resonant frequency (referred to as F1, which may be 77 Hz. in this illustrative application), the filter 104 will supply operating voltage to amplifier 112 through resistor 114. Under such operating conditions, voltage is applied through amplifier output circuit 116 to rectifier 118, causing D-C potential to be applied momentarily through lead 120 to solenoid 122 of relay RLY–4, the operation of which will be described in further detail below.

The output circuit 124 of amplifier 100 is connected to filter 126, comprising solenoid 128 and tuned reed 130, responsive only to a designated control frequency (referred to as F2, which may be 67 Hz.). Reed contact arm 132 of filter 126 is connected through resistor 134 to amplifier 136 which, when voltage is applied by suitable vibration of tuned reed 130, will, through output circuit 138 and rectifier 140, momentarily produce D-C voltage on conductor 142. This conductor is connected to normally open relay contact 143 of relay RLY–4 which, when solenoid 122 is energized, will apply D-C voltage through closed relay contacts 143 and 143A and conductor 142A to solenoid 144 of relay RLY–3 (the operation of relay RLY–3 opens normally closed relay contacts 148, 148A, the function of which will be described hereinafter).

Audio signals on the output lead 149 (within shield 151) of amplifier 82 are applied in the illustrative application of the invention through a highpass filter 152, whose function is to pass frequencies in the voice band (from approximately 100 Hz. to 3000 Hz.) and to attenuate signals below this range. The audio signals then follow output lead 154, within grounded shield 155, to an adjustable attenuator or volume control 156 of any suitable, well-known type, preferably of a type that will attenuate audio signals to a desired extent and will maintain a proper impedance match as related to the output circuit of filter 152. This function may be fulfilled by a "T pad," as schematically shown, located within remote control unit 68. The output lead 158 of attenuator 156 is connected through lead 160 in ground shield 159, to normally open relay contact 262A of relay RLY–4. Thus, under this condition, the audio output on lead 160 terminates at open relay contact 262A. However, if the solenoid 122 of relay RLY–4 is energized by a received and rectified "start" signal of frequency F1 (from tape segment 48 in FIG. 3), and relay locking voltage has been applied to solenoid 122 through closure of "start" switch 282 as will be described, contacts 262, 262A are closed. In this situation, audio program signals will be applied from attenuator output 158 across output lead 160, through closed relay contacts 262, 262A and conductor 160A in ground shield 161, to the input 164 of audio power amplifier 166. Amplifier output 168 applies audio voltage to speakers 170, 170A and 170B, representing a typical speaker arrangement of the type which may be employed in the public address system of aircraft or other vehicles.

Subcarrier voltage derived from subcarrier amplifier and demodulator 76 is applied through subcarrier output circuit connection 172 to amplifier 174, tuned to subcarrier frequency, whose output 176 is connected to rectifier 178.

The D-C voltage from rectifier 178 thus is applied to solenoid 180 of relay RLY–2 through circuit connection 182 when a multiplex subcarrier of predetermined frequency, to which the subcarrier amplifiers 76 and 174 are tuned, is being received. Closure of normally open contacts 182 and 182A of relay RLY–2, effected only when rectified subcarrier voltage is sufficient to operate solenoid 180, completes the circuit of the visual "In-Range" indicator light 184, from ground at contact 182A, through contact 182, conductor 194, filament 192 and conductors 190 and 214 to positive terminal 186 of battery 188 or other potential source whose negative terminal is at ground potential. Normally open contacts 183 and 183A of relay RLY–2 are connected in series in conductor 210 between "start" switch 282 (with its associated contacts, 280, 280A) and the solenoid 208 of relay RLY–1. This necessitates that relay contacts 183 and 183A be in the closed position before the "start" switch 282 can apply voltage to relay RLY–1, and automatically assures that a strong subcarrier signal of desired frequency is being received at the time when relay RLY–1 is actuated by "start" switch 282. This arrangement also precludes the possibility that relay RLY–1 may inadvertently be actuated in a vehicle by "start" switch 282 prior to the time when an effective subcarrier signal, of desired frequency and strength, is being received.

When the aircraft or other vehicle is within reliable receiving range of station 14, as indicated by energization of "In-Range" lamp 184, the receiving equipment may be placed in "ready" condition at any desired time by manual operation of "press-to-start" switch button 282A. Momentary closure of "start" switch contacts 280 and 280A by contact arm 282 briefly applies positive potential from battery terminal 186 through conductor 210 to the solenoid 208 of relay RLY–1, momentarily closing all contacts of that relay. Positive potential simultaneously is applied from battery terminal 186 through conductor 214, normally closed contacts 148, 148A of relay RLY–3 and now closed contacts 212, 212A of relay RLY–1 to its solenoid 208. This locks relay RLY–1 in its energized position as long as relay contacts 148 and 148A, associated with "stop" relay RLY–3, are in the normally closed position as illustrated in FIG. 4. When relay RLY–1 is energized, contacts 92, 92A are closed, permitting received control signals, when they appear on the output lead 78 of the subcarrier amplifier and demodulator 76, to be applied to the inputs 94 and 96 of amplifiers 98 and 100 respectively.

Thus, after closure of contacts 92, 92A of relay RLY–1, when the "start" signal of frequency F1 is received, it will cause actuation of tuned reed 108 in filter 104, thereby energizing solenoid 122 of relay RLY–4. On energization of solenoid 122, normally open contacts 220 and 220A are closed, thereby locking relay RLY–4 in closed position by application of positive potential from battery terminal 186, through conductor 214, normally closed contacts 148, 148A of "stop" relay RLY–3, conductor 122, contacts 220, 220A, voltage dropping resistor 224, conductor 120 and solenoid 122 to negative ground. Under this condition, when program signals are received after the "start" signal, they will be applied from conductor 160 through closed contacts 262, 262A and conductor 160A to power amplifier 166 and thence to speakers 170, 170A, etc. All signals in the program cycle following th e"start" tone (tape segment 48) and including the introductory chimes (tape segment 50), program material (tape segment 52) and the concluding chimes (tape segment 54) will then be heard through the speakers 170, 170A, etc.

Thereafter, the "stop" tone (recorded on tape segment 56), such as a signal having a frequency referred to as F2 (which may be 67 Hz. in this instance), will cause actuation of tuned reed 130 in filter 126, thereby applying D-C potential from rectifier 140 through closed contacts 143, 143A of RLY–4 and through conductor 142A to solenoid 144 of "stop" relay RLY–3. Energization of this relay by the received "stop" signal will open the normally closed relay contacts 148, 148A, causing removal of the energizing voltage on solenoids 208 and 122 of relays RLY–1 and RLY–4 respectively. This results in the opening of relay contacts 262, 262A of relay RLY–4, breaking the circuit connection between conductors 160 and 160A leading to the audio input 164 of power amplifier 166. Further reproduction of audio signals by loudspeakers 170, 170A, etc. is thereby prevented after the "stop" signal has been received. As seen in FIG. 3, the stop signal, recorded on tape segment 56, is the final element in the "automatic program cycle."

The circuitry illustrated in FIG. 4 is also arranged to give visual indications at the remote control unit 68 of the operative conditions of the various control relays. Thus, the activation of relays RLY–1 (responsive to the depression of "start" button 282A) and RLY–4 (responsive to reception of a "start" tone) is indicated by the lighting of lamps 200 and 270 respectively. Contacts 206, 206A of relay RLY–1, when closed, apply ground through conductor 207 to "start" indicator lamp 200 through filament 202 and conductor 214 to the positive terminal 186 of battery 188. When contacts 150, 150A of RLY–4 are closed, as occurs after receipt of a "start" signal, visual "operate" indicator lamp 270 is activated by completing the circuit from positive terminal 186 of battery 188, through conductors 214 and 272, filament 268, conductor 266 and relay contacts 150, 150A to ground.

It will be noted that because of the interconnection of relays RLY–1, RLY–3 and RLY–4, as described herein, received signals cannot be reproduced by speakers 170, 170A, etc., except after closure of contacts 262, 262A of "start" relay RLY–4. This relay can be energized only by the transmitted "start" signal of designated frequency F1 after start button 282A has been depressed. It also will be noted that with the arrangement of relays as shown, if the start button 282A is actuated during the interval between transmission of a "start" signal and a succeeding "stop" signal (i.e., after tape segment 48 and before tape segment 56), solenoid 144 of "stop" relay RLY–3 cannot be energized. This prevents premature de-energization of relay solenoid 208, which would open all contacts and preclude operation of relay RLY–4 when the "start" signal is later received in the next cycle. (At that time, relay RLY–4 will initiate reproduction of the program signals.) Use of automatically interlocked relays in the arrangement as shown also presents the advantage that in the event of a momentary drop-out or weakening of the subcarrier signal, as is common in mobile services, no relay will be open by such momentary loss in signals and the integrity of the audio program circuit between amplifier 82 and power amplifier 166 will be maintained.

The selective response characteristic of filter 104 and its associated relay RLY–4 may be utilized to permit selective reproduction of a desired specific type of program at the receiving point. This is achieved by making filter 104 respond only to a "start" control signal of a frequency that is correlated with a particular type of program or information. For example, a subscriber employing the receiver arrangement of the invention would be able to hear only a desired type of information, such as market reports, if the frequency to which filter 104 responds is correlated with this specific type of information.

The same receiver arrangement also will permit selective reproduction of news or information addressed to passengers of a specific airline or other carrier. For example, a specific "start" frequency may be used to cause selective response of filter 104 and operation of relay RLY–4 only in aircraft of a particular airline as it enters the transmission zone 12 in FIG. 1. Aircraft of another airline would receive different information by use of a different frequency "start" control signal in tape segment 56 (FIG. 3) and a different filter 104, responsive only to a selected "start" signal of given frequency F1.

Although it is recognized that other types of filters and control signals may be used in lieu of tuned reed filters and that other frequencies below 100 Hz. may be employed in the presently preferred embodiment of the invention, the system as disclosed herein can be expected to have a high order of reliability of operation. This is attributable in part to the fact that the disclosed structure does not respond to noise, interference or public program signals, and requires a signal of predetermined frequency and duration for operation.

Use of a multiplex subcarrier of frequency modulation type is advantageous since it permits the use of subcarrier limiting methods in the receiver as well as the main carrier limiting action normally associated with FM tuners. This provides an audio signal of relatively constant amplitude, despite wide variations in the received main carrier signal strength that normally are encountered in receiving radio signals in aircraft or other vehicles due to reflection of wave energy from other vehicles, tall buildings, hills and other objects on the ground, changes in orientation of the vehicle carrying the receiver and other factors that affect radio-wave propagation.

While the use of FM multiplex transmitting and receiving methods is described herein in connection with the systems of the invention, it is to be understood that in other applications of the invention (e.g., in the highway and railroad fields or in hotels) other transmission modes and types of transmitters and receivers may be employed in conjunction with the control system as described without departing from the spirit of the invention.

It is to be understood that the above-described arrangements are illustrative of the application of the principles of the invention. Numerous other arrangements may be devised by those skilled in the art without departing from the spirit and scope of the invention.

What is claimed is:

1. A system for automatic transmission of program and control signals to and reception at a vehicle comprising:
means for transmitting repetitive information in cyclical form, each cycle including
a first control signal having a first predetermined frequency;
program signals and a second control signal having a second predetermined frequency, said first and second control signals respectively defining the beginning and end of an automatic program cycle; and
receiving means at said vehicle including
manually-operable enabling means for enabling said receiver to reproduce said transmitted information;
first control means selectively responsive to said first control signal, after the receiver has been enabled by operation of said enabling means, for initiating reproduction of said program signals;
second control means selectively responsive to said second control signal for terminating reproduction of said program signals at the end of said program cycle and for deactivating said enabling means to prevent said receiver from reproducing said transmitted information until reoperation of said enabling means, whereby said receiver will reproduce only a single cycle of said program signal, commencing at the beginning and terminating at the end of said cycle, for each operation of said enabling means.

2. A system in accordance with claim 1 wherein said first control means comprises:
first switching means connected to said enabling means and selectively responsive to said first control signal only after said enabling means has been actuated for initiating reproduction of said program signals, and said second control means comprises
second switching means connected to said first switching means and selectively responsive to said second control signal only when said first switching means has been activated for terminating reproduction of of said program signals.

3. A system in accordance with claim 2 wherein said means for transmitting includes
an FM multiplex broadcast transmitter broadcasting a main program signal;
subcarrier circuit means coupled to said transmitter for multiplex broadcasting of said program material on a multiplex subcarrier together with said main program signal;
and wherein said receiving means includes
an antenna for picking up signals from said transmitter;
a tuner connected to said antenna and having subcarrier demodulating means;
amplifying means responsive to the output of said subcarrier demodulating means for presenting said control signals to said control means; and
output reproduction means connected to said amplifying means through said first switching means for reproducing said program material following reception of said first control signal.

4. A system in accordance with claim 3 wherein said receiving means includes
means for placing said enabling means in operative condition in response to the detection by said subcarrier demodulating means of said subcarrier signal having a predetermined signal strength.

5. In a communications system of the type which includes a transmitter for continuous repetitive broadcasting of a unit of program material together with first and second control signals, respectively preceding and following said unit of program material, by modulation of an electromagnetic carrier of predetermined frequency with means for impressing the control signals and program material on the carrier and a mobile receiver having connected in sequence an antenna, a tuning stage tuned to the carrier frequency, a demodulator, a power amplifier and a speaker, and energized by a power supply, for audibly reproducing said unit of program material in response to said first and second control signals, the improvement in said receiver comprising:
manually-operable enabling means;
first control means enabled by activation of said enabling means and responsive to the first control signal to connect the output of the receiver demodulator to the input of the power amplifier; and
second control means enabled by activation of said enabling means and responsive to the second control signal to disconnect the output of the demodulator from the input of the power amplifier and to deactivate said enabling means, whereby said receiver automatically reproduces one and only one of said units of program material from beginning to end upon each activation of said enabling means.

6. A communications system in accordance with claim 5 wherein said first and second control signals comprise first and second tones with frequencies in the audio range.

7. A communications system in accordance with claim 6 wherein said means for impressing the control signals and program material on the carrier comprises:
playback means for retrieving in sequence said first control signal, said unit of program material, and said second control signal from a prerecorded record medium and for presenting them for modulation of said carrier.

8. A communications system in accordance with claim 6 wherein said first control means comprises:
a first narrow bandpass filter connected by operation of said enabling means to the output of the receiver demodulator and tuned to the frequency of said first tone for selectively passing said first control signal;
a first relay responsive to the first control signal passed by said first filter for connecting the output of said demodulator to the input of said power amplifier; and said second control means comprises:

a second narrow bandpass filter connected by operation of said enabling means to the output of the receiver demodulator and tuned to the frequency of said second tone for selectively passing said second control signal; and a second relay responsive to the second control signal passed by said second filter for disconnecting the output of said demodulator from the input to said power amplifier.

9. A communications system in accordance with claim 8 wherein said enabling means comprises:

manually-operable starting means; and a third relay activated by said starting means for connecting the output of the receiver demodulator to the input of said first filter, whereby said first control signal is presented to said first filter only upon prior operation of said starting means.

10. A communications system in accordance with claim 9 wherein said enabling means further comprises:

a fourth relay connected to the receiver demodulator and activated by a signal of said carrier frequency having a predetermined single strength for connecting said starting means to said third relay, whereby said starting means can activate said third relay only when a signal of said predetermined strength has activated said fourth relay.

11. A communications system in accordance with claim 9 wherein:

said starting means comprises a momentary contact switch; and said third relay includes a set of normally open holding contacts for maintaining activation of said third relay after release of said starting means.

12. A communications system in accordance with claim 11 wherein said first relay is activated by said first control signal passed by said first filter and includes:

a first set of normally open contacts between the output of said demodulator and the input of said power amplifier;

a second set of normally open contacts connecting the output of said second filter to said second relay, whereby said second relay is activated by said second control signal only after said first relay has been activated by said first control signal; and a third set of normally open contacts connecting said power supply to said first relay for maintaining activation of said first relay after cessation of said first control signal.

13. A communication system in accordance with claim 12 wherein said second relay includes a first set of normally closed contacts connecting said third set of first relay contacts to said power supply, whereby activation of said second relay will disconnect said first relay from said power supply.

References Cited

UNITED STATES PATENTS

| | | | |
|---|---|---|---|
| 2,259,316 | 10/1941 | Lyle | 343—228 |
| 2,429,607 | 10/1947 | Capen | 343—200 |
| 2,630,525 | 3/1953 | Tomberlin et al. | 343—228 |
| 2,709,254 | 5/1955 | Halstead | 343—200 |
| 3,105,119 | 9/1963 | Cory et al. | 343—226 |
| 3,106,711 | 10/1963 | Bott. | |

ROBERT L. GRIFFIN, Primary Examiner

J. A. BRODSKY, Assistant Examiner

U.S. Cl. X.R.

343—200, 228; 325—64